US007080978B2

(12) United States Patent
Glaesener

(10) Patent No.: US 7,080,978 B2
(45) Date of Patent: Jul. 25, 2006

(54) PLATEN

(75) Inventor: Pierre Glaesener, Bissen (LU)

(73) Assignee: Husky Injection Molding Systems Ltd., Bolton (CA)

( * ) Notice: Subject to any disclaimer, the term of this patent is extended or adjusted under 35 U.S.C. 154(b) by 308 days.

(21) Appl. No.: 10/418,004

(22) Filed: Apr. 17, 2003

(65) Prior Publication Data

US 2004/0208950 A1 Oct. 21, 2004

(51) Int. Cl.
*B29C 45/17* (2006.01)

(52) U.S. Cl. ............ 425/472; 100/295; 156/580; 425/595

(58) Field of Classification Search ........... 425/406, 425/451.9, 472, 595; 100/295; 156/580
See application file for complete search history.

(56) References Cited

U.S. PATENT DOCUMENTS

| 1,977,549 | A | 10/1934 | Glasner |
| 2,719,443 | A | 10/1955 | Derbyshire |
| 2,807,206 | A | 9/1957 | Saives |
| 3,669,593 | A | 6/1972 | Cyriax |
| 3,805,584 | A | 4/1974 | Nilsson |
| 4,243,369 | A | 1/1981 | James |
| 4,576,092 | A | 3/1986 | Yamato |
| 4,589,836 | A | 5/1986 | Fjellman |
| 4,613,475 | A | 9/1986 | Hettinga |
| 4,615,857 | A | 10/1986 | Baird |
| 4,726,754 | A * | 2/1988 | Breuker et al. ............ 425/406 |
| 4,976,400 | A | 12/1990 | Martell et al. |
| 5,059,105 | A | 10/1991 | Baird |
| 5,066,217 | A | 11/1991 | Fukuzawa et al. |
| 5,100,283 | A | 3/1992 | Carty |
| 5,110,283 | A | 5/1992 | Bluml et al. |
| 5,123,834 | A | 6/1992 | Joyner |
| 5,162,782 | A | 11/1992 | Yoshioka |
| 5,163,363 | A | 11/1992 | Gilgert et al. |
| 5,188,850 | A | 2/1993 | Hirata et al. |
| 5,192,557 | A | 3/1993 | Hirata et al. |
| 5,249,951 | A | 10/1993 | Leonhartsberger et al. |
| 5,460,505 | A | 10/1995 | Ito et al. |
| 5,547,367 | A | 8/1996 | Stein |
| 5,593,711 | A | 1/1997 | Glaesener |
| 5,753,153 | A | 5/1998 | Choi |
| 5,776,402 | A | 7/1998 | Glaesener |

(Continued)

FOREIGN PATENT DOCUMENTS

DE 40 04 026 A1 8/1990

(Continued)

OTHER PUBLICATIONS

International Preliminary Examination Report for PCT/CA2004/000348, dated Jun. 28, 2005.

*Primary Examiner*—James P. Mackey

(57) ABSTRACT

A platen (50) for a molding machine includes an intermediate support structure (20) between two planar walls (16, 18) having ribs (40) arranged at a non-normal angle β to a first wall (18). The ribs (40) couple forces from the first wall (18) to the second wall (16) in such a way that bending of the second wall (16) is resisted. This adds to the rigidity of the second wall (16) and hence the platen (50), adding to flatness of the arrangement. Gussets (42) may be provided extending between the ribs (40) and the intermediate support structure (20). This has the effect of surrounding and supporting an injection bore (14) and further adding to the coupling of forces to the edge portions of the second wall (16) to resist forces acting to bend the wall.

55 Claims, 4 Drawing Sheets

U.S. PATENT DOCUMENTS

| | | | | |
|---|---|---|---|---|
| 6,027,329 A | * | 2/2000 | Nazarian et al. | 425/451.9 |
| 6,171,097 B1 | * | 1/2001 | Urbanek | 425/595 |
| 6,439,876 B1 | * | 8/2002 | Glaesener | 425/595 |
| 6,746,232 B1 | * | 6/2004 | Becker et al. | 425/595 |
| 6,776,605 B1 | * | 8/2004 | Becker et al. | 425/595 |

FOREIGN PATENT DOCUMENTS

| | | |
|---|---|---|
| EP | 0 192 814 B1 | 4/1991 |
| FR | 2 284 433 | 9/1976 |
| WO | WO 92/11991 | 7/1992 |

* cited by examiner

Figure 1: prior art

PLATEN

BACKGROUND OF INVENTION

1. Field of the Invention

This invention relates to a platen for use in industrial machines, particularly presses such as injection molding machines, and particularly, but not exclusively, plastic injection-molding machines operating with a large clamp force/closure tonnage.

2. Background Information

Platens are essentially robustly constructed support structures that locate, support and align mold halves under applied clamp/closure tonnage. Each platen in a system must therefore be arranged to convey force effectively to the mold. In a molding process, as will be understood, it is important to maintain a high degree of parallelism between surfaces of a platen (and also between platens), since distortion in the platen correspondingly and usually induces distortion in a mold half (and particularly the mold face) located within the platen. Indeed, under applied clamp tonnage, platens should ideally be entirely resilient to physical distortions in their structure, thereby ensuring that a mold surface remains undistorted and hence substantially (and preferably entirely) flat. It is important to maintain, as far as possible, the flatness of the mold and platens.

In use, mold-bearing faces of co-operating platens are moved relative to each other to cause the formation of a mold through the aligned abutment of complementary mold halves. Under subsequently applied clamp tonnage, injection of melt can commence into a resultantly mold cavity defined by the two mold halves. More typically, and as will be understood, hydraulic actuators (typically dedicated pistons) are arranged to cause retraction of the tie bars (or the toggle clamp) by relative movement between a moving and stationary platen. Once in abutting and locked engagement, hydraulically actuated pistons generate a clamp force that is conveyed through the platens. Molten plastics material may then be injected (by an injection unit) into a mold cavity defined by the mold halves, thereby to form an article having a predefined shape. To enhance productivity, the mold halves are cooled by a water cooling system comprising a number of water carrying tubes, which system increases the rate at which the injected (e.g. molten plastics material) solidifies. The clamping force is then removed and the mold halves opened/separated to allow ejection or extraction of the molded article. The process can then be repeated.

Maintenance of flatness is important for many reasons. For example, by ensuring flatness, mold closure tonnage can be reduced; this saves energy and reduces potential wear between contacting elements. Approaching the issue of flatness (or, in fact, the lack of flatness) between platens and the mold halves from a reverse perspective, mold halves that are fractionally misaligned through bowing of their contact faces can suffer from part formation problems, usually related to mold "flash". When a mold and platen arrangement is closed and clamped-up in a first phase of the molding operation an equilibrium is reached but the injection of plastics material into the mold halves can cause a separation line to open up because of a lack of uniform back-up for the mold. This causes mold flash to be formed.

There are several undesirable effects pertaining to the formation of flash in a molding process. Assuming that a resultant part is usable, an additional processing technique must be employed to remove the flash; this adds to time and cost in producing a product. Also, the removal process itself may not be entirely successful and some flash may therefore remain to spoil the finish of the article. Alternatively, flash may simply render the finished article unusable either as a consequence of the part being physically deformed or significantly underweight. Flash also generally increases wear in/of the mold to degrade considerably the service life of the mold, and can further result in more generally damage to the machine when the mold is either mechanically opened or cleaned. More specifically, after flash formation during an injection cycle, solidified material (which may not be evident from simply inspection of the mold) acts to bond the mold halves together, which bond is then only broken by sufficient applied force. Removal of the flash, from a region around the mold split line, in a manual cleaning process then subjects the mold to an increased risk of damage, while cleaning is nonetheless time consuming and so affects overall productivity.

In the injection molding industry, for example, clamp tonnage varies from several hundreds of tons of closure pressure to several thousands of tons of closure pressure. With increasing clamp tonnage, even platen structures made from the strongest materials, particularly steel, can undergo distortion, principally as a consequence of a bending moment being induced in the structure by a force path through the molding machine and mold. The closure or clamping force is typically applied by either a hydraulic piston or toggle-clamp structure, with a force path usually completed through a tie-bar arrangement.

Of course, platen and mold deflection problems can be overcome by increasing closure tonnage or producing a solid block of material. However, increasing applied tonnage can act to reduce the life-expectancy of the mold, whereas increasing the physical size and robustness of the platen results in higher energy requirements (and hence higher operating costs).

In contrast with the more common box-section platen design, U.S. Pat. Nos. 5,593,711 and 5,776,402 both discloses a platen for an injection molding machine, which platen has first and second generally planar walls with an intermediate support structure linking the walls. This platen is commonly known as a REFLEX® platen and is marketed under trademark REFLEX® by Husky Injection Molding Systems, also the assignee of the present invention. The walls within this REFLEX® platen are parallel with respect to each other. A first wall is arranged to support location of a mold half therein. A cone-shaped intermediate support structure of the REFLEX® platen design operates to redistribute forces acting in the corners of the rear wall of the platen towards the centre of the mold supporting face (i.e. the front wall), with the intermediate support structure providing controlled compression (through its spring-like configuration) that promotes flatness by reducing the effects of tensile forces (arising from a bending moment) across the rear wall. In addition, the REFLEX® platen reduces overall weight of the platen. The REFLEX® platen design therefore offers considerable improvements in maintaining flatness over earlier box-section designs, irrespective of whether such box-section designs are implemented in a toggle clamp or tie-bar system.

A REFLEX® platen is shown in prior art FIG. 1, with an enlarged corner view shown in FIG. 4. This platen, whilst including the cone-like intermediate support structure, also further includes intermediate structural support ribs which are arranged perpendicular to the first and second walls, i.e. the ribs run parallel to the direction of the applied force. The ribs act to increase the rigidity of the arrangement (particularly by reducing bending moments across the rear wall) and thereby to relay some relatively small portion of the total forces (generated during clamp up) between the front and back walls.

Referring particularly to FIG. 1 (but also the sectional view in FIG. 2), active forces are shown as arrows. Tensile forces are represented by arrow heads pointing towards each other, whereas compressive forces are represented by arrow heads pointing in opposite directions. As can be seen in FIG. 1, forces from the edges of the rear wall predominantly act through the cone (i.e. the intermediate support structure) which therefore supports/undergoes compression between the front and rear faces. Forces in the platen are derived from the applied force F acting through the mold, and a return (reaction) path ($F_R$) acting from the point of tie-bar connection (at the back of a tie-bar support in each corner of the platen) and through the tie-bars themselves. In more detail, at clamp up and under applied tonnage, mold halves are pressed between the mold mounting face of the front wall of the platen and a further platen. The clamping force (F) causes compression in the walls of the cone of the intermediate support structure. These compression forces are resisted by the shape of the cone which, at the extreme pressures caused by the clamping, act in a spring-like manner. This spring-like operation is important in resisting forces which would otherwise result in a degree of non-flatness of the mold mounting face and the mold halves.

Perpendicular support ribs, located towards the centre of the two parallel walls, provide a secondary force path that runs from the point of tie-bar connection (on the rear wall) to the front face. The perpendicular support ribs are provided in pairs along each side of the platen, with the support ribs located towards a central area of the platen; this is best seen in relation to FIGS. 1 and 4. More specifically, the secondary force path is initially directed at ninety degrees (90°) to the plane of the rear wall before it runs through the perpendicular support ribs. The position of the support ribs results in the secondary force path producing a bending movement that reduces flatness between the rear and front faces, which reduction in flatness further results in bending being induced into the tie-bar by virtue of the tie bar being mechanically attached to the rear wall. Any bending in the tie-bar potentially causes metal fatigue and an increased risk of failure of the tie-bar, even though the REFLEX® platen design heretofore described acts to minimise such stresses.

SUMMARY OF INVENTION

According to the invention there is provided a platen for use in molding machine which platen comprising first and second generally planar walls and an intermediate support structure disposed therebetween and ribs projecting at a non-normal angle from the first wall to the second wall such that the ribs couple force from the first wall to the second wall to at least in part resist bending of the second wall.

By coupling forces from the first wall to the second wall in this manner, bending of the second wall is resisted by the forces coupled by the ribs to assist in the maintenance of the flatness of the arrangement.

In the specific embodiment the front wall includes a mold mounting face which in use abuts a mold and the second wall is referred to as the rear wall. A bore is provided through the walls to permit an injector unit to inject molten plastics material into the mold.

The intermediate support structure and the ribs may be complementary with the intermediate support structure function being assisted by the ribs. The function will include the coupling of forces between the walls.

Preferably, the ribs are joined to the second wall at edge regions. By joining the ribs at the edge regions compressive forces are coupled to the rear wall to resist bending of the rear wall at the edge regions. By coupling the forces to the edge portion of the rear wall the coupled forces will have a greater ability to resist the bending forces. The ribs are, preferably, joined to the first wall relatively laterally inwards of the edges of the wall. It is important to note that the ribs may be integrally formed with the first and second walls in a metal founding process or fabricated separately and welded in place.

In the specific embodiment the ribs project from the first wall to the second wall in a divergent manner. The angles that the ribs make with the wall are substantially equal but for some arrangements this may not necessarily be the case.

The non-normal angle lies in a range of twenty to seventy degrees with a preferred range of twenty-five to forty degrees. The most preferred range is twenty-eight to thirty five degrees.

Preferably, the first wall is generally rectangular and bores are provided at corner regions to accept tie bars. The ribs may then be connected to the corner regions of the second wall to couple the forces in an efficient manner. Alternative shapes for the first wall can be used and the bores located at the edge portions.

Preferably, in order to improve flatness, the intermediate support structure further comprises a conical cavity-defining wall and the ribs join the cavity-defining wall.

The ribs are preferably associated with gussets which extend from the rib to the intermediate support structure. Preferably, the gusset and associated rib are integrally formed. The gusset may also extend in an arc about the bore to more efficiently couple the forces. The gussets are preferred since they will act to further resist any bending forces in the second wall.

According to a second aspect of the invention there is provided a platen for a molding machine comprising first and second generally planar walls maintained in spaced apart parallel relationship by an intermediate support structure disposed therebetween and at least one rib extending between the first and second generally planar walls and at a non-normal angle thereto to couple at least some compressive forces normal to the first planar wall to the second wall to resist bending of the second wall. This second aspect may also include gusset arrangements.

A further aspect of the invention provides a platen for use in a clamping operation wherein a force is generated in a first direction, comprising: a mold platen having two walls spaced from each other, with a first of said walls being on a mold side and a second of said walls being spaced from and parallel to said first wall, wherein said first and second walls extend substantially transverse to said first direction of said force, wherein each of said first and second walls have edges and a centre area and wherein an intermediate support structure is positioned between and connected to both of said walls, the second wall further including bores located towards the corners thereof through which, in use, tie-bars are located to support mechanical coupling of the tie-bars to the second wall such that, in use, a clamp force is conveyed through the mechanical coupling and said intermediate support structure and via said first wall, said intermediate support structure adapted for directing said force away from the edges of said first wall toward the centre area of said first wall for substantially preventing deflection of said first wall, said intermediate support structure having a narrow end coupled centrally to the first wall and a wide end coupled to the second wall, the intermediate support structure further being arch-shaped, conical-shaped, V-shaped or C-shaped and structurally assembled such as to support, under clamp force, mechanically-designed compression thereof in the first direction; the platen further including ribs projecting at a non-normal angle from the first wall to the second wall such that the ribs couple force from the first wall to the second wall to at least in part resist bending thereof, the ribs projecting outwardly from a central region of the first wall towards corners of the second wall.

It will be appreciated that in its broadest sense the ribs serve a force coupling function and alternative arrangements may be possible. In essence the ribs may provide a secondary support structure to a primary support structure which in the preferred embodiments is the intermediate support structure. Accordingly, a broad aspect of the invention provides a platen comprising first and second generally planar walls, a primary support structure disposed therebetween for coupling a majority of forces between the first and second generally planar walls and a secondary support structure for directing a minority of forces from the first wall to the second wall in a direction at a non-normal angle from the first wall to the second wall such that tensile forces are generated in the direction of the plane of the second wall.

The invention also provides a molding machine including a platen as provided in the early aspects.

BRIEF DESCRIPTION OF DRAWINGS

An embodiment of the invention will be described, by way of example only, with reference to the drawings in which.

DETAILED DESCRIPTION

Figure 2:
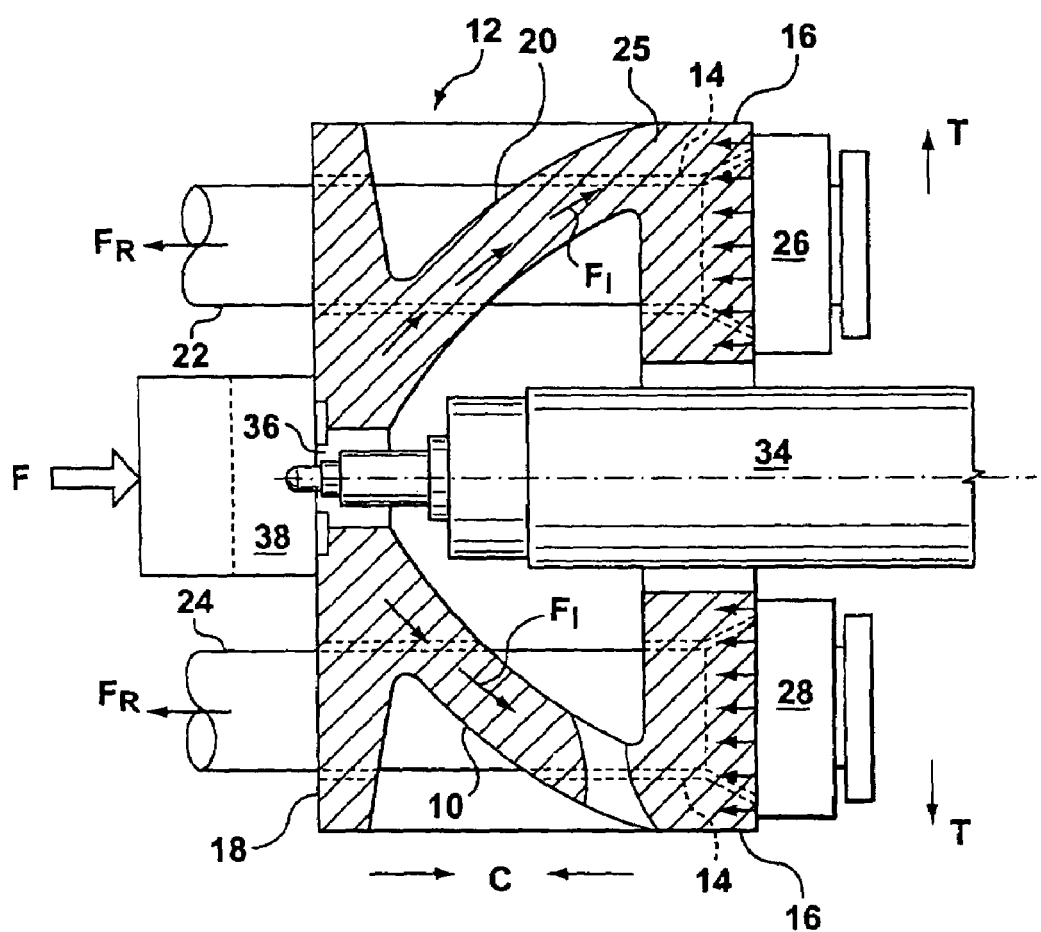
FIG. 2 is a sectional view of a prior art REFLEX® platen shown in the context of aschematic partial representation of an injection molding machine.

Referring to the drawings in greater detail, FIG. 2 is a sectional view of a REFLEX® platen 10 shown in the context of a schematic partial representation of an injection molding machine 12. The REFLEX® platen 12 is provided with bores 14 (shown in broken outline) located at the four corners of the rear face 16. A front wall/face 18 of the REFLEX® platen 12 is coupled to the rear wall through an intermediate support structure 20, typically on a generally conical or cone-like construction as taught in U.S. Pat. No. 5,593,711. This intermediate support structure extends substantially from the outer edges of the rear wall 13 towards an inner central portion of the front wall 12, with the intermediate support structure 20 skirting or including the bore 14 for the tie-bars.

Tie bar pairs 22 and 24 are coupled (or selectively coupled depending on whether the platen is a stationary platen or a moving platen) to the rear wall 16 by tie-bar nuts 26 and 28. The tie-bar nuts can be secured to the rear wall 16 by any appropriate mechanism, such as the pineapple and toothed-ring mechanism described in U.S. Pat. No. 5,753,153.

With respect to the front face 18, this is allowed to float independently of the tie-bar coupling to the rear face 16, with this floating effect achieved by either having the tie-bars either encircled by an over-sized bore or, preferably, sitting above a cut-out 30 in the front wall/face 18.

In the exemplary context of a stationary platen, it will be seen (from FIG. 2) that an injection nozzle 34 passes through the front face 18 of the platen 12. Generally, the injection nozzle is centrally located (through hole 36) relative to the front face, although an offset entry point is not precluded. The injection nozzle 34 can therefore engage with a runner system (not shown) in the back of a mold half 38 mounted in the front face 18. The benefit of having an entirely cone-shaped intermediate support structure 20 can now be appreciated, since there is no restriction on the location of the injection unit 34 with respect to the rear wall 16.

Figure 1:
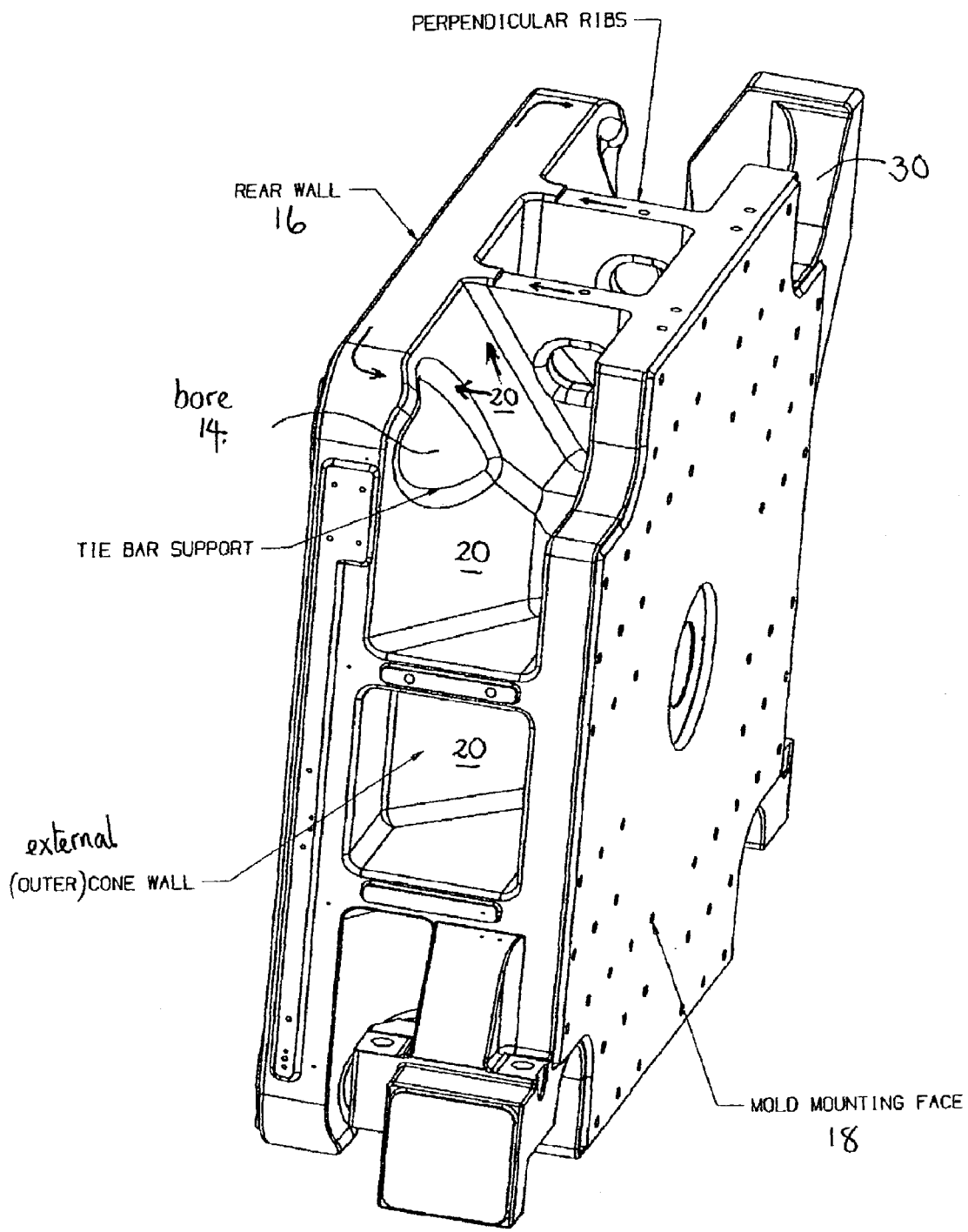
FIG. 1 shows a prior art platen.
Figure 3:
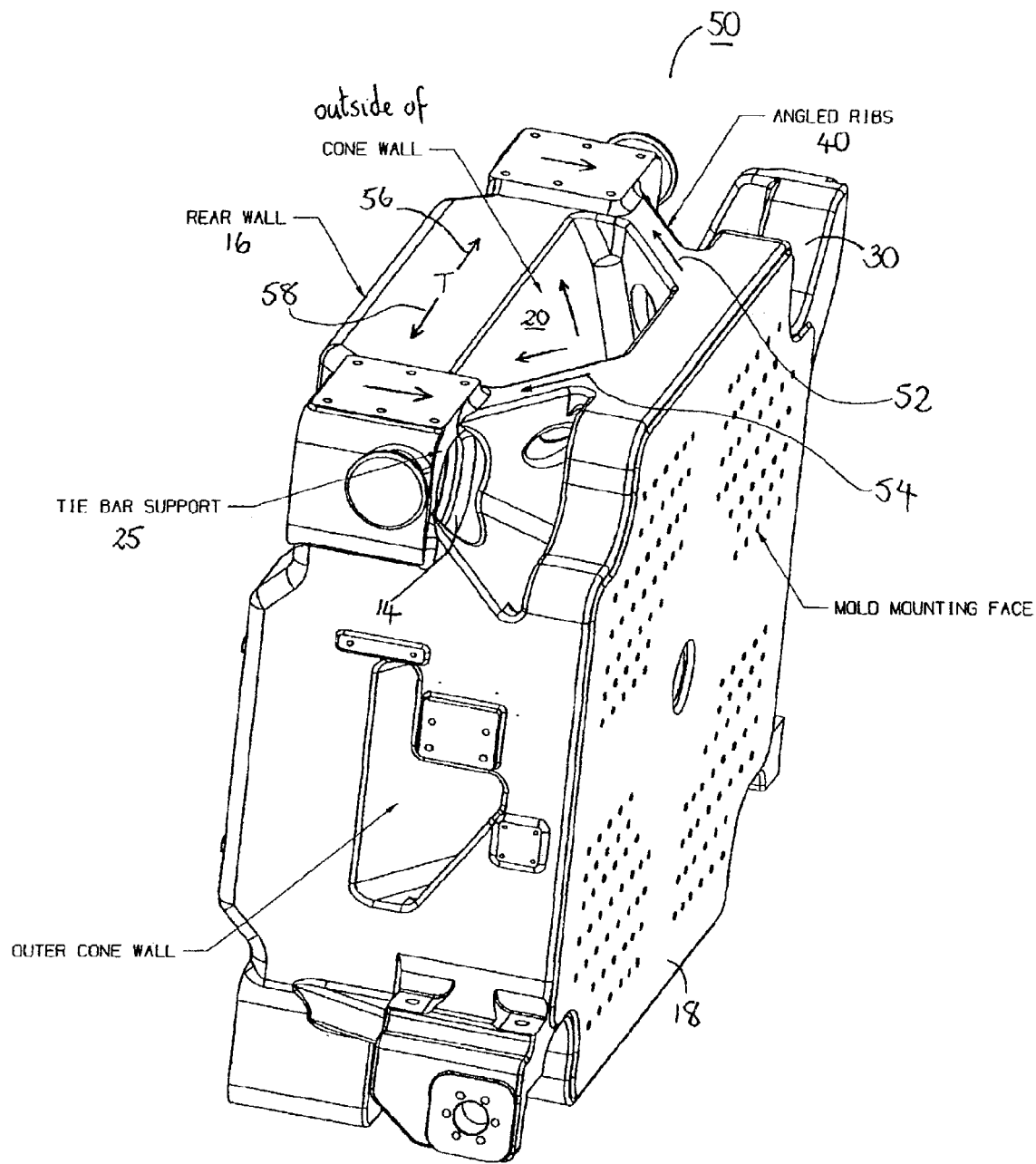
FIG. 3 is a perspective view of a platen according to a preferred embodiment of the present invention.
Figure 5:
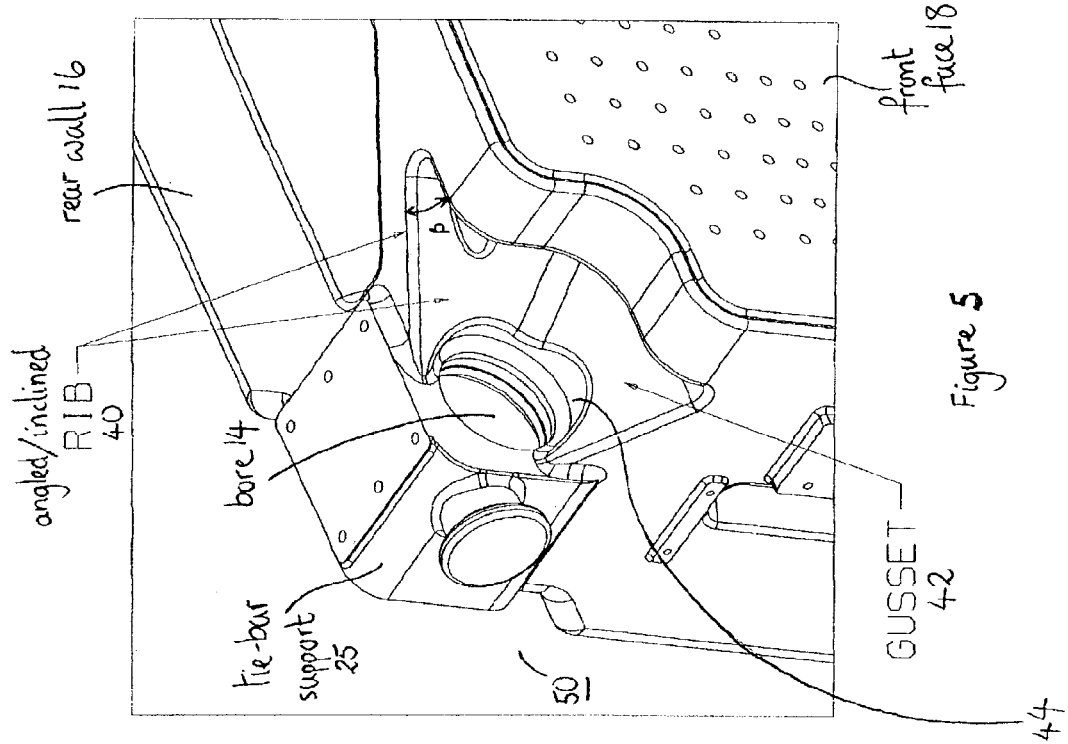
FIG. 5 is an enlarged perspective view of a corner of the platen of FIG. 3.

Focusing now on the improved platen design of the present invention, the exemplary base structure of FIG. 1 is modified to include pairs of angled/inclined but straight ribs located on at least two opposed sides of the platen 50; this is best seen in relation to FIGS. 3 and 5. As such, there are at least four inclined ribs 40 on the platen 50 of the preferred embodiment. As will be appreciated, a symmetrical configuration of ribs 40 is desirable to ensure controlled and evenly distributed loading of the platen 50 (and particular the front face 18) under applied clamp tonnage.

In a preferred embodiment, the bore 14 in the rear wall 16 is formed within a mechanically stable tie-bar support structure 25 that provides guidance and support along an end portion of the tie-bar. The guidance is limited because there is clearance between the tie-bar 22 and the bore 14. Of course, if desired, the rear wall could be extended inwardly (as shown in FIG. 2), thereby obviating some of the requirements underlying the tie-bar support structure.

Each pair of ribs 40 extend between the front and the rear walls, and splay/diverge outwards from a central region of the front face 18 towards (and preferably substantially onto) an outer edge of the tie-bar support 25 (and particularly the edge of the bore 14). Each angled rib 40 is inclined at an angle $\beta$ relative to the front face 18. The angle $\beta$ is preferably in the range of between about twenty degrees (20°) and seventy degrees (70°), more preferably in the range of between about twenty-five (25°) degrees to forty degrees (40°) and most preferably in the range of about twenty-eight degrees (28°) to thirty-five degrees (35°). Pairs of ribs 40 on opposite sides of the platen share the same angular symmetry. The angle is somewhat dependent upon the overall size and also the separation of the walls of the platen. As will be understood, if the angle $\beta$ is made too shallow, the ribs potentially overlap and intersect; this is undesirable since the force path is preferably distributed (rather than concentrated) across a central portion of the front face 18 of the platen 50. By employing the pairs of ribs 40 of the preferred embodiment of the present invention, the force path to the tie-bars is less abrupt and provides smoother force transitions and resists bending of the edges of the platen.

The angled ribs may be solid or may include apertures to reduce weight or provide lift points for the platen 50.

Figure 4:
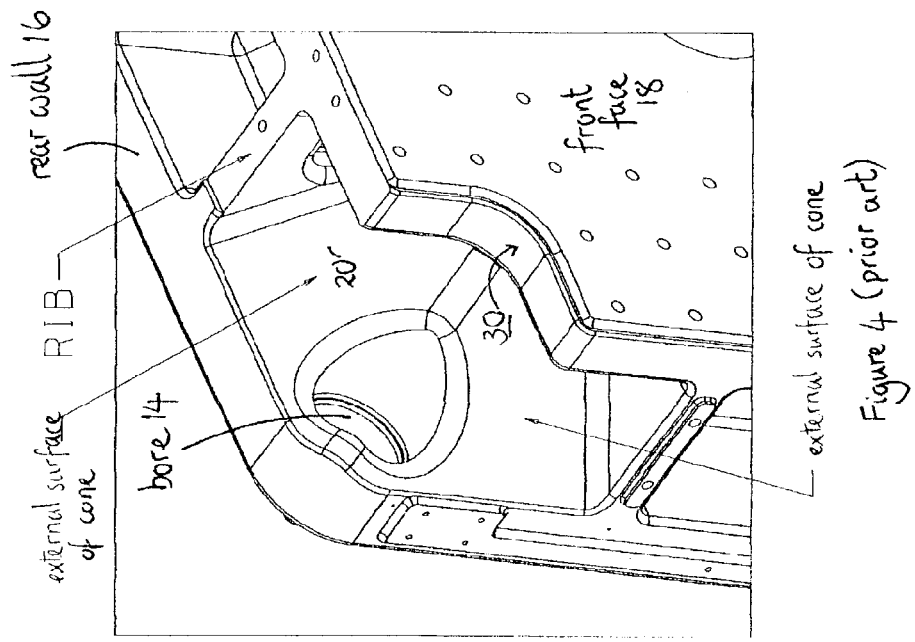
FIG. 4 is an enlarged perspective view of a corner of the platen of FIG. 2.

Additionally, each angled rib 40 may be complemented by an angled support gusset 42 that extends laterally outwardly from each angled rib and which gusset 42 is formed and coupled between a backside of the front wall 18 and the rear wall 16. The gusset 42 is typically located inboard and hence away from the edge of the platen, i.e. the gusset 42 intersects the rib 40 in a region towards the central area of the front wall 18 of the platen 50. The gusset 42 preferably further extends about an arc 44 defined by a lower surface of the bore 14 through the tie-bar support. In this way, the combination of each rib 40 and the complementary gusset 42 extend a substantial way (approximately half way) about the entire bore 14. Preferably, the contiguously formed gusset 42 and rib arrangement extend about the bore 14 to the greatest extent possible, with this extent only constrained by the necessity to locate the tie-bar into its corresponding bore 14. The gusset 42 consequently provides additional support in the region of the tie-bar support 25, which gusset 42 therefore also enhances/improves (i.e. by providing a more direct) force path through the platen 50. In other words, use of the gusset 42 provides greater support of the platen edge due to the fact that the gusset 42 extends around the bore 14. The differences between the prior art design and the improved platen can best be seen by comparing FIGS. 4 and 5.

Preferably, each rib 40 is integrally formed with its corresponding gusset 42. As will be appreciated, the rib 40 and the gusset 42 are independent of the intermediate support structure 20, e.g. the cone of FIG. 3.

The angled ribs 40 direct forces from the front wall 18 to the rear wall 16 in the following manner. The clamping force F is normal to the mold mounting face 18 of the front wall, with this applied force generating compressive force paths indicated by arrows 52 and 54 within the plane of the ribs 40. These compressive forces 52 and 54 are coupled, by the ribs 40, to the edge portion of the rear wall 16 in a region/position proximate to the bore 14 of the tie-bar support 25. However, unlike the prior art arrangement, the angled nature of the ribs 40 cause a substantial component of the forces to be directed outwards and so, when coupled to the rear wall 16, result in an improved tensile force profile in the plane of the rear wall 16. Tensile forces in the rear wall are indicated by arrows 56 and 58. These tensile forces 56 and 58 are directed in the plane of the wall towards the tie-bar support and into the tie-bars (not shown, reference numeral 24 of FIG. 2) to complete the force path through the clamp structure. It is important to note that by applying tensile forces to the rear wall 16 in this way, the rear wall 16 is held more rigid than would otherwise be the case with the design of FIG. 1, although the benefit of the REFLEX® platen design is retained. The structural arrangement of FIGS. 3 and 5 therefore assist in the rear wall 16 resisting deformation out of its plane which would otherwise result in an increasing degree of non-flatness or deflection. Thus, in this way, the angled ribs 40 (and the complementary gusset) couple the forces in an advantageous manner to assist in resisting deformation of the rear wall 16 and any attendant resulting deflection.

Accordingly, the inclined ribs of the present invention provide additional support to the intermediate support structure that couples forces from the mold mounting face to the rear wall in such a way as to generate in the rear wall tensile forces which increase the rigidity of the rear wall. Moreover, the inclined ribs 40 (and gussets 42) now directly support the tie-bar support 25 to reduce loading in the region of the tie-bar support 25. In an alternative functional description, the angled/inclined ribs and complementary (but optional) support gusset 42, besides providing additional support to the tie bar, reduce the degree or amount of bending by causing an equalization in the distribution of the force across the rear wall. The bending moment in the rear wall of the improved platen design of the present invention has therefore been reduced, with the angle of forces now not perpendicular. The force path from the tie-bar nut contact has provided a gradual, smoothed force transition that reduces platen edge deflection. In practical terms, the improved force transition within the platen results in an ability to reduce platen weight and/or reduce closure/clamp tonnage whilst still retaining good performance.

As for the physical dimensioning of the ribs, this is a function of rib loading and intermediate support structure operation. As will be understood, a technique of finite element analysis (FEA) can be employed to determine optimum structural configurations.

It should be noted that conical intermediate support structure could be replaced with other configurations which offer the same enhancement to platen flatness. The application of inclined ribs with the optional gusset to better support the tie-bar support is therefore generally applicable to platen construction, and has been described only in the context of a REFLEX® platen 12 for the purposes of understanding of the underlying principles.

The platen is preferably of cast construction, although alternative manufacturing and machining technique can be employed in its production, All cross-referenced patents and application referred to in this specification are hereby incorporated by reference.

It will, of course, be appreciated that the above description has been given by way of example only and that modifications and variations will be readily apparent to the skilled exponent without departing from the scope of the appended claims. For example, whilst the present invention has been described in the context of a stationary platen on an injection molding machine, the platen design finds application in all platens and across a broad spectrum of press technologies employing a wide variety of clamp closure forces.

The invention claimed is:

1. A platen comprising:
   first and second generally planar walls;
   an intermediate support structure disposed therebetween; and
   ribs, supplementary to the intermediate support structure, projecting at a non-normal angle from the first wall to the second wall such that the ribs couple force from the first wall to the second wall to at least in part resist bending of the second wall.

2. The platen as claimed in claim 1, wherein the ribs are joined to the second wall at edge regions.

3. The platen as claimed in claim 2, wherein the ribs are joined to the first wall at a position laterally inwards of the edges of the first wall.

4. The platen as claimed in claim 1, wherein the ribs are provided as mutually divergent pairs of ribs projecting from the first wall to the second wall.

5. The platen as claimed in claim 1, wherein the first wall is generally rectangular and bores are provided at corner regions to accept tie bars.

6. The platen as claimed in claim 5, wherein the ribs are connected to the corner regions of the second wall.

7. The platen as claimed in claim 1, wherein the intermediate support structure further comprises a conical cavity-defining wall.

8. The platen as claimed in claim 1, wherein the ribs project at an angle in the range of about twenty to about seventy degrees.

9. The platen as claimed in claim 8, wherein the ribs project at an angle in the range of about twenty-five to about forty degrees.

10. The platen as claimed in claim 9, wherein the ribs project at an angle in the range of about twenty-eight to about thirty-five degrees.

11. The platen as claimed in claim 1, wherein the ribs comprise at least four pairs of ribs.

12. The platen as claimed in claim 1, wherein the ribs are solid.

13. The platen as claimed in claim 1, further comprising at least one gusset disposed between at least one of the ribs and the intermediate support structure.

14. The platen as claimed in claim 13, wherein respective gusset extends angularly from its respective rib to the intermediate support structure.

15. The platen as claimed in claim 13, wherein the gusset extends in an arc about a tie bar support.

16. The platen as claimed in claim 15, wherein each gusset extends substantially about the tie bar support.

17. The platen as claimed in claim 13, wherein the gusset and the rib are integrally formed.

18. The platen of claim 1, wherein the platen is installed in an injection molding machine.

19. A platen for a molding machine, comprising:
first and second generally planar walls maintained in spaced apart parallel relationship by an intermediate support structure disposed therebetween; and
at least one rib, supplementary to the intermediate support structure, extending between the first and second generally planar walls and at a non-normal angle thereto to couple at least some compressive forces normal to the first planar wall to the second wall to at least in part resist bending of the second wall.

20. The platen as claimed in claim 19, wherein the at least one rib couples to an edge region of the second planar wall.

21. The platen as claimed in claim 19, wherein the at least one rib couples to a part of the second planar wall having a tie bar support.

22. A platen for use in a clamping operation wherein a force (F) is generated in a first direction, comprising:
a mold platen (10, 110, 210) having two walls spaced from each other, with a first of said walls (12, 112, 212) being on a mold side and a second of said walls (14, 114, 214) being spaced from and parallel to said first wall, wherein said first and second walls extend substantially transverse to said first direction of said force (F), wherein each of said first and second walls have edges and a centre area and wherein an intermediate support structure (16, 116, 216) is positioned between and connected to both of said walls, the second wall further including bores (38) located towards the corners thereof through which, in use, tie-bars (25) are located to support a mechanical coupling of the tie-bars to the second wall such that, in use, a clamp force (F, FI, FR) is conveyed through the mechanical coupling and said intermediate support structure and via said first wall, said intermediate support structure (16, 116, 216) adapted for directing said force (F) away from the edges of said first wall toward the centre area of said first wall for substantially preventing deflection of said first wall, said intermediate support structure having a narrow end coupled centrally to the first wall and a wide end coupled to the second wall, the intermediate support structure further being arch-shaped, conical-shaped, V-shaped or C-shaped and structurally assembled such as to support, under clamp force (F, FI, FR), mechanically-designed compression (C) thereof in the first direction;
the platen further including ribs projecting at a non-normal angle from the first wall to the second wall such that the ribs couple force from the first wall to the second wall to, at least in part, resist bending thereof, the ribs projecting outwardly from a central region of the first wall towards corners of the second wall.

23. The platen of claim 22, further comprising gussets extending between associated ribs and the intermediate support structure.

24. The platen of claim 23, wherein the gussets extend at an angle to the ribs to the intermediate support structure.

25. The platen of claim 24, wherein the gussets and associated ribs are integrally formed.

26. The platen of claim 22, further comprising a tie-bar support structure located at the corners.

27. The platen of claim 26, wherein the tie-bar support structure includes bores through corner portions of the second wall to, in use, locate tie-bars by means of which the clamp force is at least in part applied.

28. A platen comprising:
first and second generally planar walls;
a primary support structure disposed therebetween for coupling a majority of forces between the first and second generally planar walls; and
a secondary support structure including ribs for directing a minority of forces from the first wall to the second wall in a direction at a non-normal angle from the first wall to the second wall to at least in part resist bending of the first wall, the ribs also inclined at a non-normal angle relative to the primary support structure.

29. The platen as claimed in claim 28, in which the secondary support structure couples forces to corner portions of the second wall.

30. The platen as claimed in claim 29, further comprising tie-bar support structures located at the corner portions.

31. The platen as claimed in claim 30, wherein the tie-bar support structures include bores.

32. The platen as claimed in claim 28, further comprising a gusset between the primary and secondary support structure.

33. The platen as claimed in claim 32, wherein the gusset and the secondary support structure are integrally formed.

34. The platen as claimed in claim 28, wherein the primary support structure couples forces from an outer portion of the first wall to an inner portion of the second wall.

35. A platen comprising:
a front wall for supporting, in use, a mold;
an end wall having corners;
an intermediate support structure disposed between the front wall and the end wall, the intermediate support structure including a first set of ribs that generally support, in use and under applied clamp tonnage, a compression function between the front wall and end wall; and
a second set of ribs distinct from the first set of ribs of the intermediate support structure, the second set of ribs projecting at a non-normal angle from the front wall to the end wall such that the second set of ribs, under applied clamp tonnage, at least in part resist bending of the end wall by bracing the corners of the end wall relative to the front wall.

36. The platen as claimed in claim 35, further comprising a gusset disposed between each of the second set of ribs and the intermediate support structure.

37. The platen as claimed in claim 36, wherein respective gusset extends angularly from its respective rib to the intermediate support structure.

38. The platen as claimed in claim 36, wherein the gusset extends in an arc about a tie bar support.

39. The platen as claimed in claim 38, wherein each gusset extends substantially about the tie bar support.

40. The platen as claimed in claim 36, wherein the gusset and each rib of the second set of ribs are integrally formed.

41. The platen as claimed in claim 38, wherein the tie-bar support includes bores through the corners of the end wall.

42. The platen of claim 35, wherein the platen is installed in an injection molding machine.

43. A platen comprising:
   a front wall having a mold mounting surface and a rear surface;
   an end wall generally planar with but spaced apart from the rear surface of the front wall, the end wall having edges and corners;
   an intermediate support structure disposed between the end wall and the front wall, the intermediate support structure realised by a first set of ribs that generally define an arch-shaped, conical-shaped, V-shaped or C-shaped configuration having a narrow end and a wide end, the narrow end coupled centrally to the rear surface of the front wall and the wide end coupled towards the edges of the end wall; and
   a second set of ribs distinct from the first set of ribs of the intermediate support structure, the second set of ribs coupling together the front wall and the end wall, the second set of ribs inwardly projecting at a non-normal angle from the corners of the end wall, whereby the second set of ribs, under applied clamp tonnage, at least in part resist bending of the end wall by bracing the corners of the end wall.

44. The platen as claimed in claim 43, further comprising a gusset disposed between each of the second set of ribs and the intermediate support structure.

45. The platen as claimed in claim 44, wherein respective gusset extends angularly from its respective rib to the intermediate support structure.

46. The platen as claimed in claim 44, wherein the gusset extends in an arc about a tie bar support.

47. The platen as claimed in claim 46, wherein each gusset extends substantially about the tie bar support.

48. The platen as claimed in claim 46, wherein the tie-bar support includes bores through the corners of the end wall.

49. The platen as claimed in claim 44, wherein the gusset and each rib of the second set of ribs are integrally formed.

50. The platen of claim 43, wherein the platen is installed in an injection molding machine.

51. A platen comprising:
   first and second generally planar walls;
   an intermediate support structure disposed therebetween;
   ribs projecting at a non-normal angle from the first wall to the second wall such that the ribs couple force from the first wall to the second wall to at least in part resist bending of the second wall; and
   at least one gusset disposed between at least one of the ribs and the intermediate support structure.

52. The platen as claimed in claim 51, wherein respective gusset extends angularly from its respective rib to the intermediate support structure.

53. The platen as claimed in claim 51, wherein the gusset extends in an arc about a tie bar support.

54. The platen as claimed in claim 53, wherein each gusset extends substantially about the tie bar support.

55. The platen of claim 54, wherein the platen is installed in an injection molding machine.

\* \* \* \* \*